United States Patent
Carl (10) Patent No.: US 8,956,506 B2
(45) Date of Patent: Feb. 17, 2015

(54) ROTARY EVAPORATOR

(75) Inventor: Joachim Carl, Stein (DE)

(73) Assignee: Hans Heidolph GmbH & Co. KG, Kelheim (DE)

( * ) Notice: Subject to any disclaimer, the term of this patent is extended or adjusted under 35 U.S.C. 154(b) by 757 days.

(21) Appl. No.: 12/695,519

(22) Filed: Jan. 28, 2010

(65) Prior Publication Data

US 2010/0193345 A1 Aug. 5, 2010

(30) Foreign Application Priority Data

Jan. 30, 2009 (DE) .................... 10 2009 006 746

(51) Int. Cl.
*B01D 3/08* (2006.01)
(52) U.S. Cl.
CPC ............... *B01D 3/085* (2013.01); *Y10S 203/02* (2013.01); *Y10S 285/911* (2013.01)
USPC ........... 202/238; 202/100; 202/136; 202/188; 202/216; 202/249; 202/266; 203/DIG. 2; 159/11.1; 464/183; 285/236; 285/911
(58) Field of Classification Search
CPC ............... B01L 7/00–7/54; B01L 9/00–9/547; B01L 2200/0678
USPC ......... 202/188–189, 238, 266, 100, 131, 136, 202/216, 218, 249; 203/DIG. 2; 159/11.1–12; 196/112, 118; 122/11–12; 285/231–234, 272–282, 285/236, 911
See application file for complete search history.

(56) References Cited

U.S. PATENT DOCUMENTS

| | | | | |
|---|---|---|---|---|
| 2,453,669 | A * | 11/1948 | Meneses | 285/332 |
| 2,712,520 | A * | 7/1955 | Nester | 202/153 |
| 3,034,573 | A | 5/1962 | Ueberwasser et al. | |
| 3,219,099 | A * | 11/1965 | Hamlow et al. | 159/6.1 |
| 3,342,696 | A * | 9/1967 | Bush | 202/172 |
| 4,390,500 | A * | 6/1983 | Miskinis | 422/545 |
| 4,582,444 | A * | 4/1986 | Miskinis | 403/16 |
| 4,780,178 | A * | 10/1988 | Yoshida et al. | 159/6.1 |

(Continued)

FOREIGN PATENT DOCUMENTS

DE 1 519 556 A1 3/1970
DE 15 19 593 A1 11/1970

(Continued)

OTHER PUBLICATIONS

European Search Report dated Jun. 10, 2010. EP Application No. 10000643.6.

(Continued)

*Primary Examiner* — Thomas McKenzie
(74) *Attorney, Agent, or Firm* — Gifford, Krass, Sprinkle, Anderson & Citkowski, P.C.

(57) ABSTRACT

The invention relates to a rotary evaporator comprising a rotary drive having a hub and a clamping insert with a sleeve-like basic shape, in particular a clamping sleeve, for the clamping of a steam leadthrough formed as a hollow glass shaft in the hub of the rotary drive, wherein the clamping insert has a longitudinal axis and a first and a second axial end, wherein the clamping insert has two clamping sections which are arranged spaced apart from one another in the longitudinal direction and which each have an outer cross-section tapering toward the first end and of which the clamping arrangement arranged closer to the second end has a larger maximum outer cross-section.

20 Claims, 4 Drawing Sheets

(56) References Cited

U.S. PATENT DOCUMENTS

| | | | | |
|---|---|---|---|---|
| 4,913,777 A | * | 4/1990 | Parkinson | 202/205 |
| 4,956,151 A | * | 9/1990 | Steck | 422/544 |
| 5,243,836 A | * | 9/1993 | Spring | 62/499 |
| 5,337,806 A | * | 8/1994 | Trunner | 165/47 |
| 5,589,135 A | * | 12/1996 | Bossart | 422/561 |
| 5,639,354 A | * | 6/1997 | Zellweger | 202/238 |
| 5,759,356 A | * | 6/1998 | Spring | 202/205 |
| 5,919,339 A | * | 7/1999 | Ikeda | 202/238 |
| 6,709,025 B2 | * | 3/2004 | Spring | 285/272 |
| 7,597,360 B2 | * | 10/2009 | Kubala | 285/98 |
| 7,722,822 B2 | * | 5/2010 | Logan | 422/561 |
| 7,820,452 B2 | * | 10/2010 | Parkinson | 436/181 |
| 2002/0148718 A1 | * | 10/2002 | Genser | 202/238 |
| 2010/0193345 A1 | * | 8/2010 | Carl | 202/238 |

FOREIGN PATENT DOCUMENTS

| | | |
|---|---|---|
| DE | 2 413 750 A1 | 11/1974 |
| DE | 31 14 449 A1 | 10/1982 |
| DE | 197 10 475 A1 | 9/1998 |

OTHER PUBLICATIONS

German Search Report dated Sep. 23, 2009 DE 10 2009 006 746.9.

* cited by examiner

ROTARY EVAPORATOR

CROSS-REFERENCE TO RELATED APPLICATION

This application claims priority of German Patent Application DE 102009006746.9 filed Jan. 30, 2009.

FIELD OF THE INVENTION

The present invention relates to a rotary evaporator comprising a rotary drive having a hub and a clamping insert with a sleeve-like basic shape, in particular a clamping sleeve, for the clamping of a steam leadthrough formed as a hollow glass shaft in the hub of the rotary drive, wherein the clamping insert has a longitudinal axis and a first axial end and a second axial end.

BACKGROUND OF THE INVENTION

A rotary evaporator is a piece of laboratory equipment which includes a heating bath and an evaporator flask which can dip into the heating bath. In operation, a liquid medium present in the heating bath, for example water or—for higher temperatures—oil, is heated in order thus to heat the evaporator flask dipped into the heating bath. A liquid mixture contained in the evaporator flask can hereby be heated so that the respective distillate, in particular solvent, is evaporated. The evaporated distillate then flows into a cooler of the rotary evaporator to condense there. The condensate is subsequently collected in a collection flask. The distillation residue remaining in the evaporator flask can be further processed or analyzed. A vacuum pump is frequently additionally provided for the generation of a vacuum in the evaporator flask and in the cooler to lower the boiling point, whereby the distillation can be accelerated and the distillation rate can be increased.

A rotary evaporator furthermore includes a rotary drive for the rotation of the evaporator flask in the heating bath. The evaporator flask is uniformly heated due to the rotation and a thin liquid film, which has a large surface and from which the distillate can be evaporated fast, efficiently and gently, is produced at the heated inner wall of the evaporator flask.

In order to set the rotary damper into rotation which is, for example, rotationally fixedly connected to the initially named steam leadthrough via a ground joint, the steam leadthrough, which is formed as a hollow glass shaft and which serves to conduct the evaporated distillate from the evaporator flask to the cooler, is rotatingly driven by the rotary drive. Such a ground joint is usually secured using a Keck clamp. To enable the rotary drive of the steam leadthrough, a clamping insert having a sleeve-like basic shape can be arranged between a rotatingly drivable hub of the rotary drive and the steam leadthrough, said clamping insert clamping the steam leadthrough in a force-transmitting manner in the hub.

The steam leadthrough is connected at the cooler side to a cooler connection of the cooler, with a seal, in particular a sealing ring, being provided fixed to the housing between the cooler connection of the stationary cooler and the end of the rotatable steam leadthrough at the cooler-side end. Such a seal has, however, only a limited operating life.

SUMMARY OF THE INVENTION

It is the underlying object of the invention to provide a possibility to increase the operating life of the aforesaid seal.

This object is satisfied by a rotary evaporator having the features of claim 1 and in particular in that the clamping insert has two clamping sections which are arranged spaced apart from one another in the longitudinal direction and which each have an outer cross-section tapering toward to the first end and of which the clamping section arranged closer to the second end has a larger maximum outer cross-section.

The clamping sections are those sections of the clamping insert which, in the assembled state of a rotary evaporator, are provided to establish a force-transmitting and/or friction locking connection to a hub of a rotary drive of the rotary evaporator with their outer surfaces and a force-transmitting and/or friction locking connection to a steam leadthrough guided through the clamping insert with their inner surfaces. The force-transmitting or friction locking connection of the clamping insert to the hub of the rotary evaporator takes place at contact sections of the hub formed in opposite shape to the clamping sections. To establish the force-transmitting or friction locking connection, the clamping insert which is initially only loosely introduced into the hub and which initially only contacts the contact sections of the hub with the clamping sections is loaded by an axial force such that the clamping sections of the clamping insert are radially inwardly pivotally deflected at the contact sections, whereby a clamping of the steam leadthrough in hub is achieved. The clamping insert can already be arranged in the hub or also on the steam leadthrough on the introduction of the steam leadthrough into the hub of the rotary drive of the rotary evaporator.

Since two clamping sections are provided which are preferably arranged in the region of the two ends of the clamping element, a good centration of the steam leadthrough within the hub of the rotary drive and over the total length of the steam leadthrough can be achieved. Since the two clamping sections taper toward the same, first end of the clamping insert and the maximum outer cross-section of the clamping section arranged closer to the second end exceeds the maximum outer cross-section of the clamping section arranged closer to the first end, a centration can moreover be achieved without further components or parts being required for this purpose. The high accuracy in the centration of the steam leadthrough in the hub ensures a good true running of the steam leadthrough so that hardly any radial forces have an effect on the aforesaid seal, whereby a high service life of the seal can be achieved.

Such a good true running of the steam leadthrough cannot be achieved, in contrast, with a clamping insert which has only one clamping section which cooperates with the hub of the rotary drive of the rotary evaporator, which is arranged at the front end of the clamping insert viewed in the introduction direction and whose rear end is, for example, only centered by a clamping ring nut which has additionally to be applied and which has to be screwed onto a corresponding end of the hub. A parallel alignment of the longitudinal axis of the hub with the longitudinal axis of the steam leadthrough sufficient for a high service life of the aforesaid seal cannot be ensured in this case.

The outer surfaces of the clamping sections are preferably in each case made in frustoconical or conical form. A particularly good clamping of the steam leadthrough in the hub of the rotary drive can hereby be achieved.

The clamping insert can in each case have at least one opening or cut-out or an incision at least in the region of the clamping sections, i.e. the respective clamping section does not have to have a closed surface or a closed wall region viewed in the peripheral direction. The respective clamping section can have a plurality of clamping segments spaced apart from one another in the peripheral direction, whereby a radial compression of the respective clamping section for the clamping of the steam leadthrough in the hub of the rotary drive is facilitated. The respective opening is in particular designed in elongate form and preferably extends in the longitudinal direction of the clamping insert. The respective opening can extend, viewed in the longitudinal direction, over at least the total length of the respective clamping section and/or can be open toward a respective one of the two ends.

In accordance with an embodiment of the invention, the clamping sections each have a plurality of clamping segments of part ring shape which are arranged along a circular ring line extending concentrically to the longitudinal axis. Such an embodiment can in particular be present when the clamping sections are provided with a respective one or more of the aforesaid openings.

The clamping insert can have a plurality of longitudinal sections which are of part-sleeve shape, which together form the sleeve-like base form of the clamping insert and which are fixedly connected to one another via connection webs extending in the peripheral direction. In this respect, the connection webs are preferably arranged in a middle section arranged between the clamping sections. The connection webs can in particular be arranged at the same level viewed in the longitudinal direction.

The wall thickness of the clamping insert preferably increases in the region of the clamping sections toward the second end in each case so that the respective clamping section can push in the manner of a wedge between the steam leadthrough and a correspondingly tapering inner surface of the respective associated contact section of the hub of the rotary drive to clamp the damping leadthrough in the hub.

In accordance with a further embodiment of the invention, the outer surface of the aforesaid middle section of the clamping insert arranged between the clamping sections in the longitudinal direction is provided with a recess which in particular extends in the peripheral direction and which in particular has a cylindrical basic shape. The hub of the rotary drive of the rotary evaporator is preferably designed in a section which is at the level of the recess with an inserted steam leadthrough and with an inserted clamping insert viewed in the longitudinal direction of the hub such that a free space is formed between the clamping insert into which the clamping insert can expand. It is achieved by the recess that a clamping insert which has come into contact with distillate and which has hereby swollen up does not jam at least in the middle section between the hub of the rotary drive of the rotary evaporator and the steam leadthrough so that the steam leadthrough can also still be removed from the hub without destruction after a distillate attack.

At least one ring web which extends in the peripheral direction, projects radially outwardly and is in particular interrupted can be provided at the outer surface of the aforesaid middle section of the clamping section. Two such ring webs can in particular be provided which, viewed in the longitudinal direction, limit the aforesaid recess at its two sides, with the ring webs preferably each having a constant outer cross-section and/or the same outer cross-section. The respective ring web can be interrupted simply or multiply. Such an interruption can in particular be present when the clamping insert is provided with one or more of the aforesaid openings.

Furthermore, an outer ring web which extends in the peripheral direction, projects radially outwardly and in particular interrupted can adjoin the second end directly at the outer surface of the clamping insert, viewed in the longitudinal direction, with the clamping section arranged closer to the second end preferably directly adjoining the outer ring web.

A respective ring web which extends in the peripheral direction and projects radially inwardly can be provided at the inner surface of the clamping insert in the region of the clamping sections, with the ring webs preferably each having a constant inner cross-section and/or the same inner cross-section. This can also contribute to the steam leadthrough also still being able to be removed from the hub without destruction after a distillate attack.

In accordance with a further embodiment of the invention, a ring-shaped end face extending radially or perpendicularly to the longitudinal axis is provided at the second end of the clamping insert. The clamping insert can be loaded with force in the longitudinal direction via the end face to bring about a clamping of the clamping insert between the hub of the rotary drive of the rotary evaporator and the steam leadthrough.

A web which extends in the peripheral direction and is in particular interrupted can be provided at the inner surface of the clamping insert to engage into a groove formed as a corresponding counter-shape at the outer face of the steam leadthrough. The clamping insert can be formed in one piece and/or of plastic. The clamping section arranged closer to the first end can directly adjoin the first end viewed in the longitudinal direction. The clamping insert can have a multi-fold rotational symmetry with respect to the longitudinal axis.

The invention further relates to a rotary evaporator, in particular as is described above, comprising a rotary drive having a hub into which a clamping insert with a sleeve-like basic shape, in particular a clamping sleeve, can be inserted for the clamping of a steam leadthrough formed as a hollow glass shaft in the hub of the rotary drive, wherein the hub has a longitudinal axis and a first axial end and a second axial end, and wherein the hub has two contact sections which are arranged spaced apart from one another in the longitudinal direction, which each have an inner cross-section tapering toward the first end and of which the contact section arranged closer to the second end has a larger maximum inner cross-section.

The inner surfaces of the contact sections are preferably each designed as conical and/or a middle hub section arranged between the contact sections of the hub has a cylindrical inner cross-section.

The hub preferably has a respective cylindrical inner cross-section at its end sections arranged between the respective contact section and the respective associated end.

The contact sections of the hub are in particular designed as counter-shapes to the clamping sections of the clamping insert and/or the mutual spacing of the two contact sections corresponds to the mutual spacing of the two clamping sections.

A clamping member is preferably provided for the clamping of the clamping insert for the clamping of the steam leadthrough in the hub of the rotary drive, with the clamping member being fastenable to the rotary drive. The clamping member is in particular formed as a clamping ring nut having an internal thread, with the clamping ring nut being able to be screwed onto the hub of the rotary drive.

The invention furthermore relates to a clamping insert having a sleeve-like basic shape, in particular a clamping sleeve, for the clamping of a steam leadthrough formed as a hollow glass shaft in a hub of a rotary drive of a rotary evaporator, having a longitudinal axis and having a first axial end and a second axial end, wherein the clamping insert has two clamping sections which are arranged spaced apart from one another in the longitudinal direction, which each have an outer cross-section tapering toward the first end and of which the clamping section arranged closer to the second end has a larger maximum outer cross-section.

Advantageous further developments of the clamping insert in accordance with the invention result in an analog manner from the further developments described above with respect to the rotary evaporator in accordance with the invention.

Advantageous embodiments of the invention are also set forth in the dependent claims, in the description of the Figures and in the drawing.

BRIEF DESCRIPTION OF THE DRAWINGS

The invention will be described in the following by way of example with reference to the drawing. There are shown, schematically in each case:

FIG. 2a a part cross-section along a longitudinal axis of a hub of a rotary drive of a rotary evaporator having an inserted clamping sleeve and an inserted steam leadthrough as well as a ground joint and an evaporator flask;

FIG. 2b an enlarged detail of the region A from FIG. 2a;

FIG. 3 a perspective view of the clamping sleeve of FIG. 2a;

DETAILED DESCRIPTION OF TEE PREFERRED EMBODIMENTS

Figure 1:
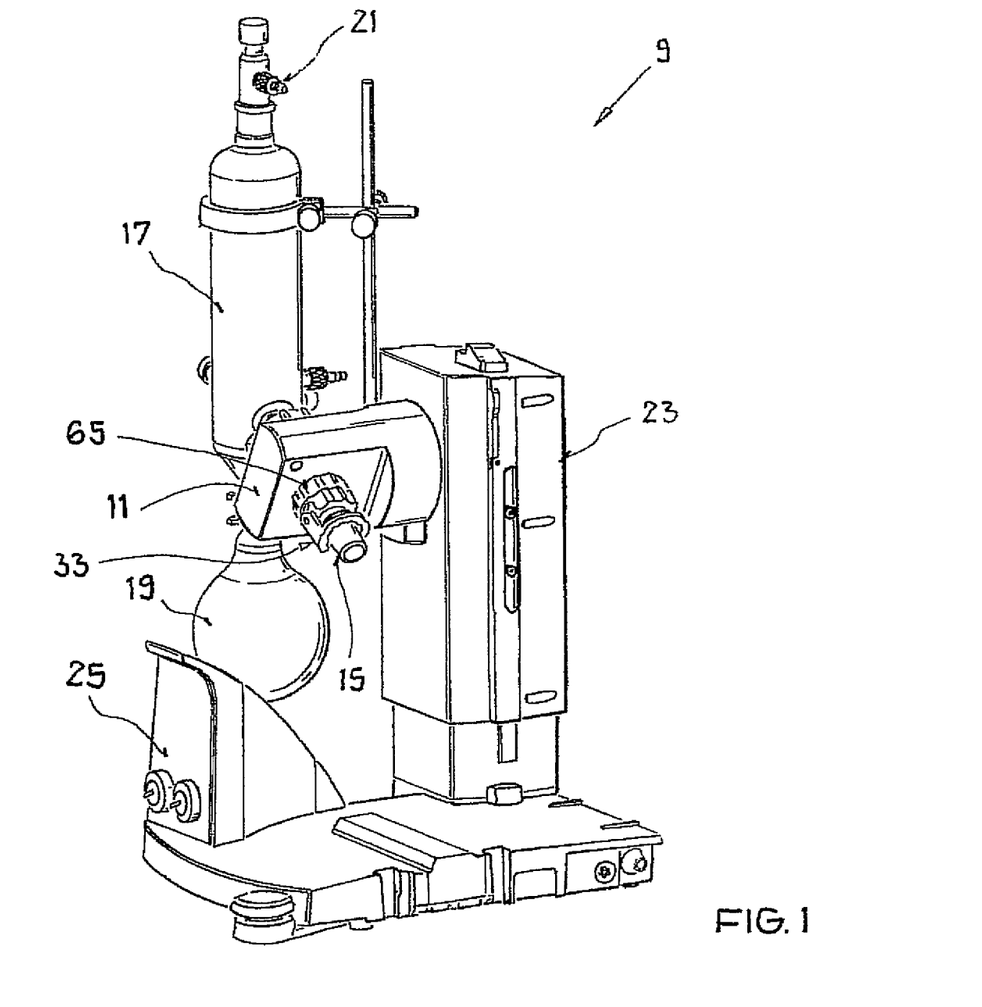
FIG. 1 a perspective view of a rotary evaporator.
Figure 2:
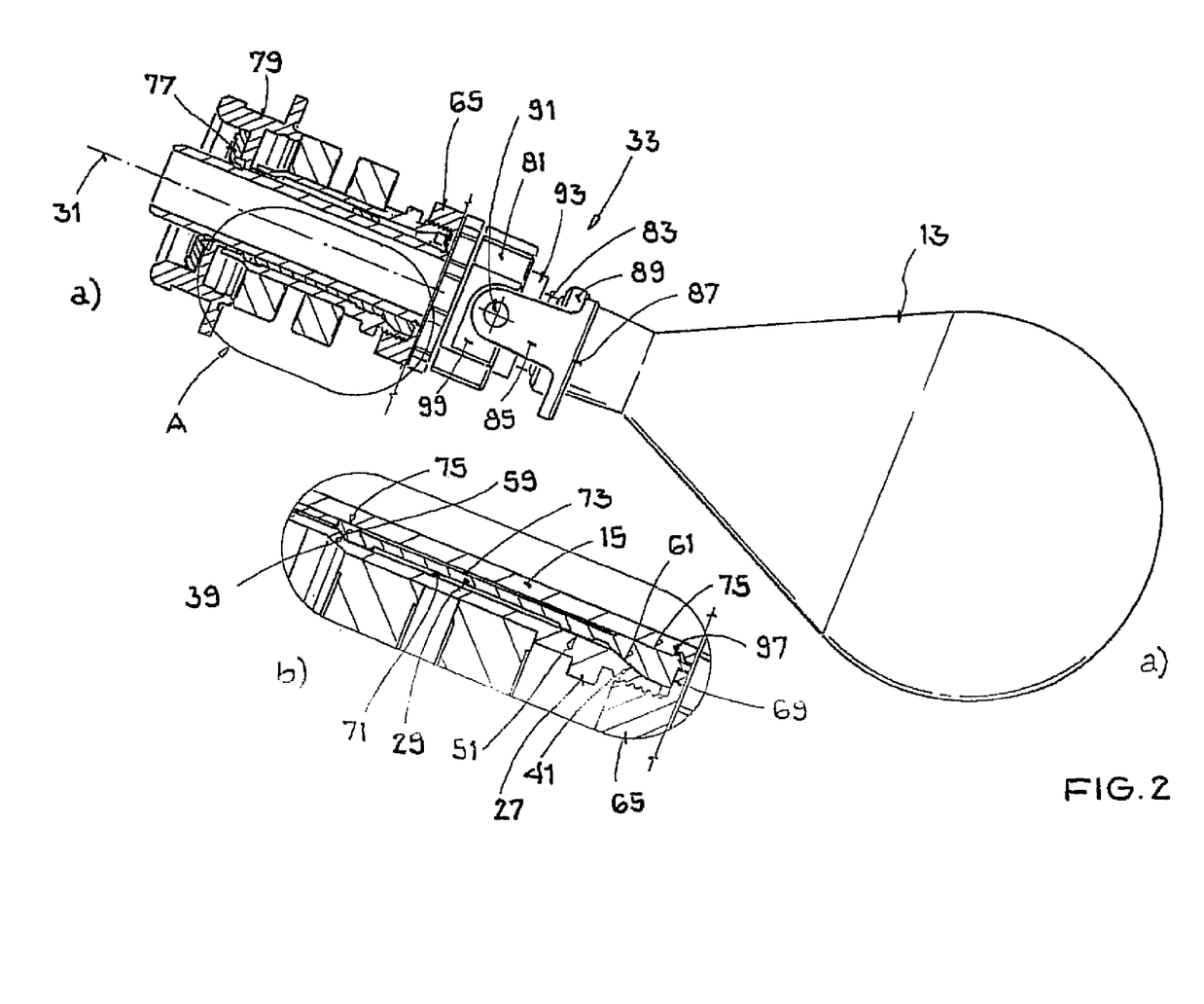

The rotary evaporator 9 shown in FIG. 1 includes a rotary drive 11 for an evaporator flask 13, in particular of glass, which is shown only in FIG. 2 and is designed as a round bottomed flask or a V-shaped flask or the like and which can be heated in a heating bath, not shown, to evaporate distillate from a liquid mixture present therein. The evaporated distillate then moves via a steam leadthrough 15 formed as a hollow glass shaft which is guided through the rotary drive 11 and of which only a ground core projecting obliquely downwardly from the rotary drive 11 can be recognized in FIG. 1 into a cooler 17 to condensate there. The condensed distillate is then collected in a collection flask 19.

A vacuum connection 21 is provided at the cooler 17 to apply a vacuum generated by a vacuum pump at the cooler 17 and at the evaporator flask 13, whereby the boiling point for the distillate can be lowered. The rotary evaporator 9 additionally includes a lift 23 which carries the rotary drive 11 and can move it in the vertical direction to lower the evaporator flask 13 into the heating bath or to lift it out of it. The rotary evaporate 9 furthermore includes an operating unit 25 for the control of the heating bath, of the rotary drive 11, of the vacuum pump and of the lift 23.

The steam leadthrough 15 is pushed through a hub 27 of the rotary drive 11 (FIG. 2) and is clamped in the hub 27 via a clamping sleeve 29 which is located between the hub 27 and the steam leadthrough 15 so that a rotation of the hub 27 of the rotary drive 11 about a longitudinal axis 31 of the hub 27 results in a corresponding rotation of the clamping sleeve 29, of the steam leadthrough 15 and of the evaporator flask 13 rotationally fixedly connected to the stream leadthrough 15. The longitudinal axis 31 is in this respect—in the assembled state of the rotary evaporator 9—a common longitudinal axis 31 of the hub 27, of the clamping sleeve 29, of the steam leadthrough 15 and of the evaporator flask 13. The hub 27, the clamping sleeve 29 and the steam leadthrough 15 are arranged concentrically to one another.

The rotationally fixed connection between the steam leadthrough 15 and the evaporator flask 13 is ensured by a ground joint, in particular a conical ground joint, in which the steam leadthrough 15 engages with its side which faces the evaporator flask 13 and at which a ground core is formed into a ground sleeve formed at a flask neck of the evaporator flask 13. A ground clamp 33 is provided to secure the ground joint, in particular formed as a ground glass joint, between the steam leadthrough 15 and the evaporator flask 13.

Figure 3:
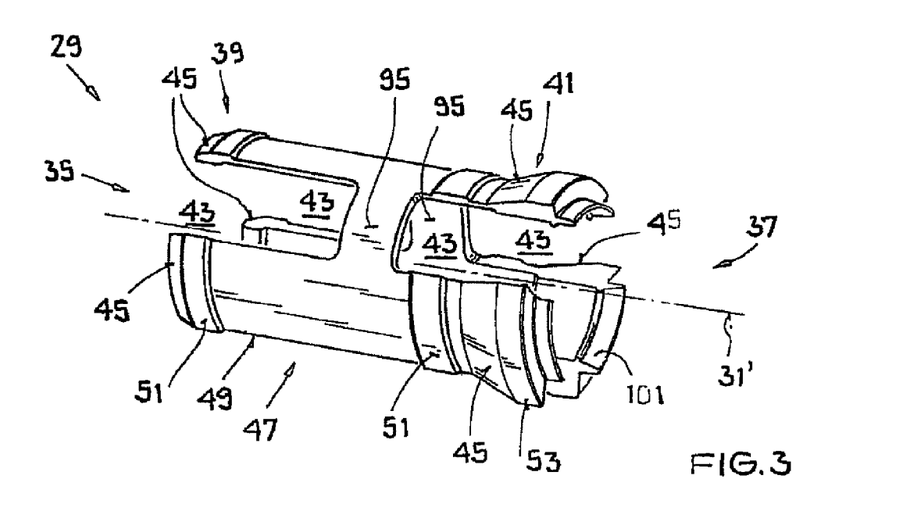

The clamping sleeve 29 having rotational symmetry, in particular three-fold rotational symmetry, and comprising plastic includes in accordance with FIG. 3 a front axial end 35 and a rear axial end 37. The clamping sleeve 29 is inserted front end 35 first into the hub 27 of the rotary drive 11 of the rotary evaporator 9. Directly adjoining the front end 35, the clamping sleeve 29 has a front clamping section 39 whose outer diameter expands conically to the rear. A further such rear clamping section 41 is provided in the rear region of the clamping sleeve 29 and its maximum outer diameter is larger than the maximum outer diameter of the front clamping section 39. Since the inner diameter of the clamping sleeve 29 is constant in each case in the region of the clamping sections 39, 41, the wall thickness of the clamping sleeve 29 increases accordingly in the region of the clamping sections 39, 41.

The clamping sleeve 29 has in each case at its two ends 35, 37 three elongate incisions or openings 43 open toward the respective end 35, 37, with the respective openings 43 being provided distributed equally in the peripheral direction of the clamping sleeve 29 at each of the two sides 35, 37. An opening 43 of the first end 35 and an opening of the second end 37 are in each case arranged along a straight line parallel to the longitudinal axis 31' of the clamping sleeve 29.

The respective opening 43 extends in the longitudinal direction 31' of the clamping sleeve 29 and, coming from the respective end 35, 37, beyond the first or second clamping sections 39, 41 respectively. Each of the two clamping sections 39, 41 is hereby divided into three clamping segments 45 of part ring shape which are arranged along a circular line extending concentrically to the longitudinal axis 31' of the clamping sleeve 29.

Expressed differently, the clamping sleeve 29 is divided into three longitudinal sections of part sleeve shape which together form the sleeve-like basic shape of the clamping sleeve 29 and are held fixedly to one another via connection webs 95 extending in the peripheral direction. A respective one of the connection webs 95 is arranged between a respective two of the longitudinal sections of part sleeve shape, with the connection webs 95 being arranged at the same level viewed in the longitudinal direction of the clamping sleeve 29.

A middle section 47 of the clamping sleeve 29 is arranged between the two clamping sections 39, 41. The middle section 47 includes a cylindrical recess 49 and two ring webs 51 which bound the recess 49 in the longitudinal direction 31' of the clamping sleeve 29, extend in the peripheral direction, project radially outwardly and are, however, interrupted by the openings 43. The two ring webs 51 each have a constant outer diameter which is the same.

A further such rear ring web 53 is furthermore provided between the rear clamping section 41 and the rear end 37 of the clamping sleeve 29. The outer diameter of the rear ring web 53 is constant in this respect and corresponds to the maximum outer diameter of the rear clamping section 41. In addition, the clamping sleeve 29 includes at its inner surface, which is otherwise formed at least substantially cylindrically, two ring webs 75 which each extend in the peripheral direction and project radially inwardly.

Figure 4:
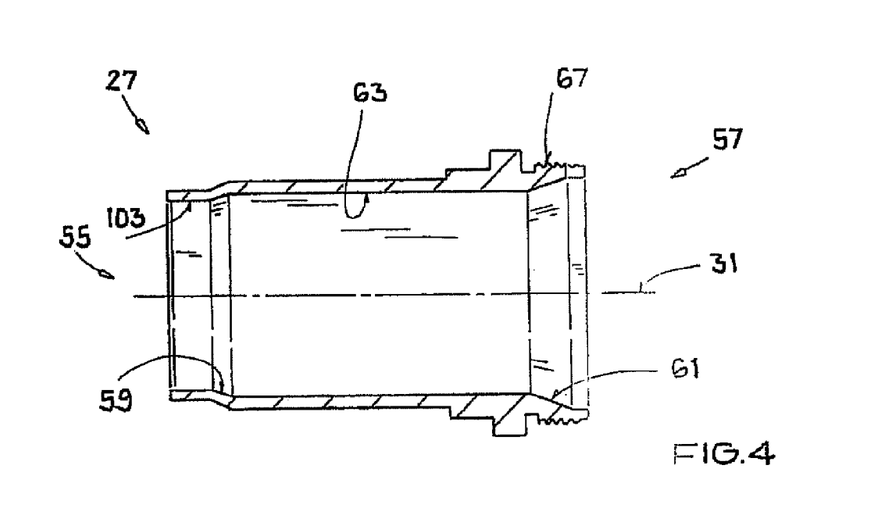
FIG. 4 the hub of FIG. 2a in an enlarged individual representation.

As can be seen from FIG. 4, the hub 27 has a front axial end 55, a rear axial end 57 and two contact sections 59, 61 which are arranged spaced apart from one another in the longitudinal direction 31 of the hub 27, with the mutual spacing of the two contact sections 59, 61 corresponding to the mutual spacing of the two clamping sections 39, 41 of the clamping sleeve 29. The contact sections 59, 61 each have an inner cross-section expanding conically toward the rear end 57 of the hub 27. The maximum inner cross-section of the rear contact section 61 is in this respect larger than the maximum inner cross-section of the front contact section 59.

The front contact section 59 of the hub 27 forms a counter-shape to the front clamping section 39 of the clamping sleeve 29; the rear contact section 61 of the hub 27 forms a counter-shape to the rear clamping section 41 of the clamping sleeve 29. The hub 27 is in each case formed cylindrically at the inner side between the two contact sections 59, 61, i.e. at a middle hub section 63, and from the respective contact section 59, 61 toward the respective end 55, 57.

The clamping sleeve 29 already pushed into the hub 27 and contacting the contact sections 59, 61 of the hub 27 with its clamping sections 39, 41 is axially loaded with force for the clamping of the steam leadthrough 15 in the hub 27 of the rotary drive 11 of the rotary evaporator 9. The front or rear clamping section 39, 41 of the clamping sleeve 29 in this respect runs onto the front or rear conical contact section 59, 61 of the hub 27, whereby the two clamping sections 39, 41 are urged radially inwardly and thus toward the steam leadthrough 15.

The axial force loading is provided by a clamping ring nut 65 (FIG. 2) which presses onto a ring shaped end face 69 formed at the rear end 37 of the clamping sleeve 29 and extending radially to the longitudinal axis 31. For this purpose, the clamping ring nut 65 includes an internal thread with which the clamping ring nut 65 is screwed onto the hub 27 whose rear end 57, at which an external thread 67 corresponding to the internal thread of the clamping ring nut 67 is formed, projects from the rotary drive 11. Clamping sleeve 29 is hereby axially clamped.

Figure 5:
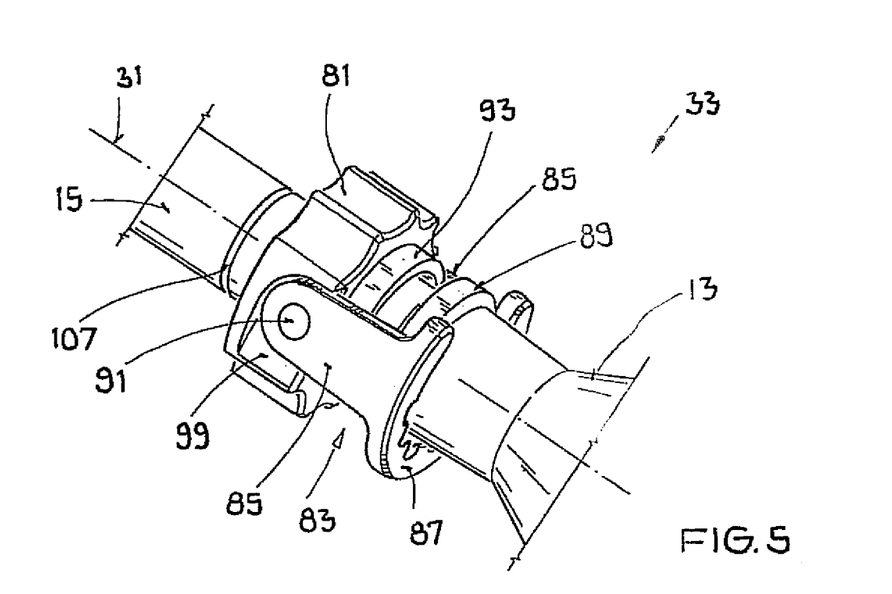
FIG. 5 a perspective view of the ground clamp of FIG. 2a in a holding position.

In the assembled state, the steam leadthrough 15 is clamped in the hub 27 by the clamping sleeve 29. It can in this respect be achieved by the openings 43 formed in the clamping sleeve 29 that the clamping sections 39, 41 can be compressed radially inwardly more easily. To define a relative axial alignment of the steam leadthrough 15 to the clamping sleeve 29, a peripheral web 97 is formed at the inner surface of the clamping sleeve 29 and engages into a groove 107 formed at the outer surface of the steam leadthrough 15 as a counter-shape (FIG. 5). A peripheral centering section 101 projects axially from the second rear end 37 of the clamping insert formed as a clamping sleeve 29; it is in particular formed in wedge shape, is in particular interrupted and is arranged in the assembled state of the clamping sleeve 29, viewed in the radial direction, between the steam leadthrough 15 and an outer wall section of the clamping ring nut 65.

A peripheral free space 71 is formed between the hub 27 and the clamping sleeve 29 in the middle region 47 of the clamping sleeve 29 due to the recess 49 which runs around there (FIG. 2b). A clamping sleeve 29 which swells up as a consequence of contact with distillate can expand into the free space 71 without a fixing of the steam leadthrough 15 in the hub 27 necessarily occurring here. This also applies in another respect to a free space 73 which is formed in the axial direction between the two ring webs 75 and in the radial direction between the clamping sleeve 29 and the steam leadthrough 15.

A good centration of the steam leadthrough 15 in the hub 27 of the rotary drive 11 of the rotary evaporator 9 and thus a good true running of the steam leadthrough 15 can be achieved by the clamping sleeve 29 with its two clamping sections 39, 41 and the hub 27 formed in counter-shape thereto and having the two contact sections 59, 61. This is in particular of advantage since a sealing ring 77 which is provided close to the front clamping section 39 and which is arranged between the steam leadthrough 15 rotating in operation and a cooler connection 79 of the stationary cooler 17 is hardly loaded in this respect. The sealing ring 77 consequently has a high operating life. Furthermore, the contact surfaces between the steam leadthrough 15 and the clamping sleeve 29 and between the clamping sleeve 29 and the hub 27 can be minimized by the clamping sleeve 29.

Figure 6:
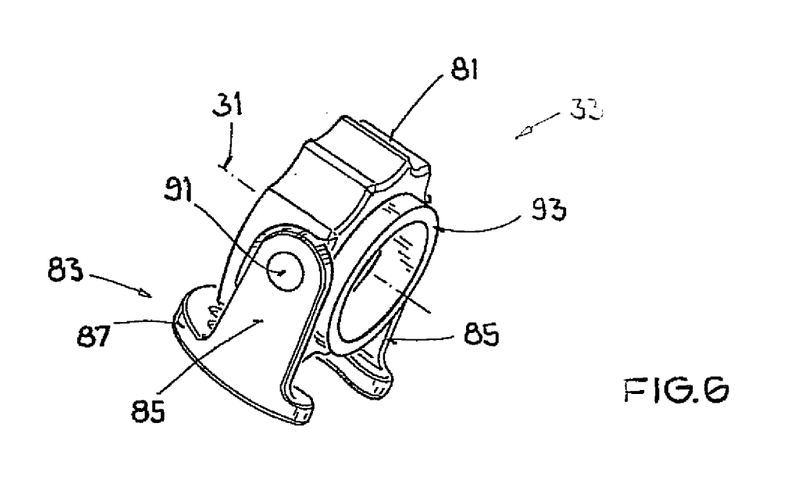
FIG. 6 a perspective view of the ground clamp of FIG. 2a in a release position.

The ground clamp 33 releasably connectable to the apparatus is shown in more detail in FIGS. 5 and 6 and includes at the ground core side, i.e. at its side facing the steam leadthrough 15, a ring nut 81 and at the ground sleeve side, i.e. at its side facing the evaporator flask 13, a clamp connector 83. The ground clamp 33 is shown together with the steam leadthrough 15 and the evaporator flask 13 in FIG. 5. For reasons of clarity, the clamping ring nut 65 is omitted in FIG. 5. The ground clamp 33 is shown in an individual representation in FIG. 6.

The ring nut 81 has an internal thread with which the ring nut 81 can be screwed onto an external thread of the aforesaid clamping ring nut 65. The ground clamp 33 can be attached or fastened secure against losing at the hub 27 of the rotary drive 11 of the rotary evaporator 9 via the ring nut 81—in particular under the agency of the aforesaid clamping ring nut 65. To facilitate a screw rotation of the ring nut 81, it—just like the clamping ring nut 65—is provided with a gripping corrugation at its outer surface.

The at least substantially hoop-shaped snap connector 83 is pivotably and centrally supported at the ring nut 81. The snap connector 83 includes two pivot arms 85 which are each pivotally connected to one of two sides of the ring nut 81 disposed diametrically opposite one another with respect to the longitudinal axis and/or the axis of rotation of the ring nut 81. The snap connector 83 furthermore includes a holding section 87 of partly ring shape. The snap connector 83 is pivotable between a holding position shown in FIGS. 1, 2 and 5 and securing the ground joint and a release position shown in FIG. 6.

The ring nut 81 and the snap connector 83 are each formed in one piece and from plastic. To form the ground clamp 33 and the pivotable support of the snap connector 83 at the ring nut 81, the snap connector 83 is latched via openings formed in the pivot arms 85 to pivot spigots 91 formed at the two diametrically opposed sides of the at the ring nut 81. The pivot range of the snap connector 83 amounts to approximately 90° and is bounded by the opening angle of a pivot recess 99 associated with the respective pivot arm 83.

The holding section 87 of part circle shape 87 is formed open at that side which runs ahead on a pivoting of the snap connector 83 from the release position into the holding position. As can be recognized from FIG. 2a, a plane is defined by the holding section 87 which extends at least substantially perpendicular to the longitudinal axis and/or the axis of rotation of the ring nut 81 in the holding position of the snap connector 83.

In the holding position, the holding section 87 of the snap connector 83 engages behind a flanged rim 89 formed at the ground sleeve of the evaporator flask 13 and snaps into the ground sleeve of the evaporator flask 13. To ensure a snapping in, the holding section 87 of part circle shape extends over a circle arc of more than 180° and is formed sufficiently spring elastically deformably at least the two ends of the part circle. The evaporator flask 13 is held by form fitting by the snap connector 83 in the holding position. The evaporator flask 13 can in particular also be held by the snap connector 83 when the snap connector 83 is no longer completely screwed onto the clamping ring nut 65.

In the release position in accordance with FIG. 6, the snap connector 83 is pivoted away from the longitudinal axis and/or the axis of rotation of the ring nut 81 by approximately 90° with respect to the holding position shown in FIGS. 1, 2 and 5 to release the flask neck and thus the evaporator flask 13.

The ring nut 81 furthermore has a prolongation which extends in the direction of the evaporator flask 13 and which is formed as a press-off section 93. If the ground joint which is not (no longer) secured can no longer be released, i.e. if the evaporator flask 13 can no longer be pulled off the steam leadthrough 15, a pressing off of the evaporator flask 13 can be achieved by unscrewing the ground clamp 33 or the ring nut 81 from the clamping ring nut 65.

A reliable and simple securing of the ground joint between the steam leadthrough 15 and the evaporator flask 13 can be achieved by the ground clamp 33. Deviations in the diameter of the ground sleeve and/or of the flask neck of the evaporator flask 13 from a standard diameter or from an expected diameter can be tolerated and have no return effect on the fastening of the ring nut 81 at the clamping ring nut 65 or at the rotary drive 11.

The invention claimed is:

1. A rotary evaporator comprising a rotary drive having a hub and a clamping insert with a sleeve-like basic shape for the clamping of a steam leadthrough formed as a hollow glass shaft in the hub of the rotary drive, wherein the clamping insert has a longitudinal axis and a first and a second axial end, characterized in that
the clamping insert has two clamping sections which are arranged spaced apart from one another in the longitudinal direction and which each have an outer cross-section surface tapering toward the first end and of which the clamping section arranged closer to the second end has a larger maximum outer cross-section than the clamping section arranged closer to the first end,
wherein the clamping sections extend around the steam leadthrough,
wherein said clamping insert is located between the hub and the steam leadthrough, and
wherein tapering surfaces on the hub engage said outer cross-section surface on said clamping sections so that axial displacement of said clamping insert relative to the hub in a first direction compresses both ends of said clamping insert radially inwardly against the steam leadthrough.

2. A rotary evaporator in accordance with claim 1, characterized in that the outer surfaces of the clamping sections are each formed conically.

3. A rotary evaporator in accordance with claim 1, characterized in that the clamping insert has at least one opening at least in the region of the clamping sections, with the respective opening extending, viewed in the longitudinal direction, over at least the total length of the respective clamping section and/or being open toward a respective one of the two ends.

4. A rotary evaporator in accordance with claim 1, characterized in that the clamping sections each have a plurality of clamping segments of part ring shape which are arranged along a circular ring line extending concentrically to the longitudinal axis.

5. A rotary evaporator in accordance with claim 1, characterized in that the clamping insert has a plurality of longitudinal sections of part sleeve shape which together form the sleeve-like basic shape of the clamping insert and are fixedly connected to one another via connection webs extending in the peripheral direction.

6. A rotary evaporator in accordance with claim 5, characterized in that the connection webs are arranged in a middle section of the clamping insert arranged between the clamping sections, with the connection webs being arranged at the same level viewed in the longitudinal direction.

7. A rotary evaporator in accordance with claim 1, characterized in that the wall thickness of the clamping insert increases in the region of the clamping sections toward the second end in each case.

8. A rotary evaporator in accordance with claim 1, characterized in that the outer surface of a middle section of the clamping insert arranged between the clamping sections in the longitudinal direction is provided with at least one recess which extends in the peripheral direction and has a cylindrical base form.

9. A rotary evaporator in accordance with claim 1, characterized in that at least one ring web which extends in the peripheral direction, which projects radially outwardly and which is interrupted is provided at the outer surface of a middle section of the clamping insert arranged between the clamping sections in the longitudinal direction.

10. A rotary evaporator in accordance with claim 9, characterized in that two such ring webs are provided which bound, viewed in the longitudinal direction, a recess at its two sides, with the ring webs each having a constant outer cross-section and/or the same outer cross-section.

11. A rotary evaporator in accordance claim 1, characterized in that an outer ring web which extends in the peripheral direction, which projects radially outwardly and which is interrupted, adjoins the second end directly at the outer surface of the clamping insert, viewed in the longitudinal direction, with the clamping section arranged closer to the second end directly adjoining the outer ring web.

12. A rotary evaporator in accordance with claim 1, characterized in that a ring web which extends in the peripheral direction and projects radially inwardly is provided at the inner surface of the clamping insert in the region of the clamping sections, with the ring web having a constant inner cross-section.

13. A rotary evaporator in accordance claim 1, characterized in that a ring-shaped end face extending radially toward the longitudinal axis is provided at the second side of the clamping insert.

14. A rotary evaporator in accordance with claim 1, characterized in that a clamping member is provided for the clamping of the clamping insert for the clamping of the steam leadthrough in the hub of the rotary drive, with the clamping member being fastenable to the rotary drive.

15. A rotary evaporator in accordance with claim 14, characterized in that the clamping member is made as a clamping ring nut having an internal thread, with the clamping ring nut being able to be screwed onto the hub of the rotary drive.

16. A rotary evaporator in accordance with claim 1, characterized in that the clamping insert can be inserted into the hub which has a longitudinal axis, a first and a second axial end and two contact sections which are arranged spaced apart from one another in the longitudinal direction and which each have an inner cross-section tapering toward the first end and of which the contact section arranged closer to the second end has a larger maximum inner cross-section.

17. A rotary evaporator in accordance with claim 16, characterized in that the inner surfaces of the contact sections are each made conically and/or a middle hub section arranged between the contact sections of the hub has a cylindrical inner cross-section.

18. A rotary evaporator in accordance with claim 16, characterized in that the hub has a respective cylindrical inner cross-section at its end sections arranged between the respective contact section and the respective associated end.

19. A rotary evaporator in accordance with claim 16, characterized in that the contact sections of the hub are formed as counter-shapes to the clamping sections of the clamping insert and/or the mutual spacing of the two contact sections corresponds to the mutual spacing of the two clamping sections.

20. A clamping insert having a sleeve-like base form for the clamping of a steam leadthrough formed as a hollow glass shaft in a hub of a rotary drive of a rotary evaporator, having a longitudinal axis and having a first and second axial end, characterized in that, the clamping insert has two clamping sections which are arranged spaced apart from one another in the longitudinal direction and which each have an outer cross-section tapering toward the first end and of which the clamping section arranged closer to the second end has a larger maximum outer cross-section than the clamping section arranged closer to the first end, wherein the clamping insert is located between the hub and the steam leadthrough, and wherein tapering surfaces on the hub engage said outer cross-section surface on said clamping sections so that axial displacement of said clamping insert relative to the hub in a first direction compresses both ends of said clamping insert radially inwardly against the steam leadthrough.

* * * * *